(12) United States Patent
Cross et al.

(10) Patent No.: US 8,799,118 B2
(45) Date of Patent: Aug. 5, 2014

(54) SYSTEM, METHOD AND COMPUTER PROGRAM PRODUCT FOR IMPLEMENTATION AND MANAGEMENT OF CHANGE-OF-CONTROL SEVERANCE

(75) Inventors: Steve Cross, Houston, TX (US); Eric Bethea, Pearland, TX (US)

(73) Assignee: Cross Consulting Partners, LLC, Houston, TX (US)

( * ) Notice: Subject to any disclaimer, the term of this patent is extended or adjusted under 35 U.S.C. 154(b) by 0 days.

(21) Appl. No.: 13/546,527

(22) Filed: Jul. 11, 2012

(65) Prior Publication Data

US 2014/0019316 A1 Jan. 16, 2014

(51) Int. Cl.
| | | |
|---|---|---|
| *G07B 17/00* | (2006.01) | |
| *G07F 19/00* | (2006.01) | |
| *G06Q 40/00* | (2012.01) | |
| *G06Q 40/02* | (2012.01) | |
| *G06Q 30/04* | (2012.01) | |
| *G06Q 20/10* | (2012.01) | |
| *G06Q 40/06* | (2012.01) | |
| *G06Q 40/04* | (2012.01) | |
| *G06Q 40/08* | (2012.01) | |

(52) U.S. Cl.
CPC ............... *G06Q 40/10* (2013.01); *G06Q 40/02* (2013.01); *G06Q 40/00* (2013.01); *G06Q 30/04* (2013.01); *G06Q 20/10* (2013.01); *G06Q 40/06* (2013.01); *G06Q 40/04* (2013.01); *G06Q 40/08* (2013.01)
USPC .......................................... 705/30; 705/36 T

(58) Field of Classification Search
CPC ....... G06Q 40/10; G06Q 40/02; G06Q 40/00; G06Q 30/04; G06Q 20/10; G06Q 40/06; G06Q 40/04; G06Q 40/08
USPC ..................................................... 705/30, 36 T
See application file for complete search history.

(56) References Cited

U.S. PATENT DOCUMENTS

| | | | | | |
|---|---|---|---|---|---|
| 5,966,693 | A | * | 10/1999 | Burgess | 705/4 |
| 6,041,313 | A | * | 3/2000 | Gilbert et al. | 705/36 R |
| 6,049,772 | A | * | 4/2000 | Payne et al. | 705/4 |
| 6,205,434 | B1 | * | 3/2001 | Ryan et al. | 705/36 R |
| 6,381,585 | B1 | * | 4/2002 | Maples et al. | 705/36 R |
| 6,401,079 | B1 | * | 6/2002 | Kahn et al. | 705/30 |
| 6,411,939 | B1 | * | 6/2002 | Parsons | 705/35 |
| 6,473,737 | B2 | * | 10/2002 | Burke | 705/4 |
| 6,944,597 | B2 | * | 9/2005 | Callen et al. | 705/4 |
| 7,330,817 | B1 | * | 2/2008 | Exall et al. | 705/321 |
| 7,343,336 | B1 | * | 3/2008 | Gottstein | 705/36 R |
| 7,383,217 | B2 | * | 6/2008 | Calderaro et al. | 705/36 R |
| 8,005,741 | B2 | * | 8/2011 | Jenkins et al. | 705/36 R |
| 8,060,387 | B2 | * | 11/2011 | Landry | 705/4 |
| 8,340,988 | B2 | * | 12/2012 | Landry | 705/4 |
| 8,355,971 | B2 | * | 1/2013 | Walker et al. | 705/35 |
| 8,433,634 | B1 | * | 4/2013 | Templeman et al. | 705/36 R |

(Continued)

OTHER PUBLICATIONS

Bring on the tax, Anonymous; The daily news; Labanon, PA, Sep. 4, 2010.*

(Continued)

*Primary Examiner* — Matthew Gart
*Assistant Examiner* — Harshad Parikh
(74) *Attorney, Agent, or Firm* — Haynes and Boone, LLP

(57) ABSTRACT

A system and related method to implement and manage severance payments during a change-of-control process, wherein participant's net benefits are equitable and maximized while considering tax liabilities and other constraints.

10 Claims, 7 Drawing Sheets

(56) References Cited

U.S. PATENT DOCUMENTS

| | | | |
|---|---|---|---|
| 2002/0004771 A1* | 1/2002 | McCain | 705/35 |
| 2002/0029177 A1* | 3/2002 | Smisek | 705/30 |
| 2002/0035533 A1* | 3/2002 | Mache et al. | 705/37 |
| 2002/0040307 A1* | 4/2002 | Roscoe et al. | 705/4 |
| 2002/0091610 A1* | 7/2002 | Smith | 705/36 |
| 2003/0078815 A1* | 4/2003 | Parsons | 705/4 |
| 2003/0120573 A1* | 6/2003 | Preti et al. | 705/35 |
| 2004/0111300 A1* | 6/2004 | Callen et al. | 705/4 |
| 2004/0138979 A1* | 7/2004 | Juhre et al. | 705/36 |
| 2004/0162771 A1* | 8/2004 | Tamatsu et al. | 705/30 |
| 2005/0187869 A1* | 8/2005 | Buerger | 705/39 |
| 2005/0273371 A1* | 12/2005 | Callen et al. | 705/4 |
| 2005/0283419 A1* | 12/2005 | Schaub | 705/35 |
| 2006/0095307 A1* | 5/2006 | Stevenson et al. | 705/7 |
| 2006/0155621 A1* | 7/2006 | Bell | 705/35 |
| 2007/0011016 A1* | 1/2007 | Alderman | 705/1 |
| 2007/0112658 A1* | 5/2007 | Dryden | 705/35 |
| 2007/0192220 A1* | 8/2007 | Edwards | 705/35 |
| 2008/0052213 A1* | 2/2008 | Bell | 705/36 R |
| 2008/0097797 A1* | 4/2008 | Morris et al. | 705/4 |
| 2008/0103840 A1* | 5/2008 | Luedtke | 705/4 |
| 2008/0215474 A1* | 9/2008 | Graham | 705/37 |
| 2008/0221935 A1* | 9/2008 | Beckers | 705/4 |
| 2009/0106053 A1* | 4/2009 | Walker et al. | 705/4 |
| 2009/0150190 A1* | 6/2009 | Solomon et al. | 705/4 |
| 2009/0228306 A1* | 9/2009 | Izyayev et al. | 705/4 |
| 2009/0281938 A1* | 11/2009 | Jenkins et al. | 705/35 |
| 2009/0313030 A1* | 12/2009 | Karmel et al. | 705/1 |
| 2011/0119095 A1* | 5/2011 | Mercier et al. | 705/4 |
| 2011/0173138 A1* | 7/2011 | Ryan | 705/36 T |
| 2011/0302001 A1* | 12/2011 | Fell et al. | 705/7.31 |
| 2012/0011061 A1* | 1/2012 | Tan et al. | 705/40 |
| 2012/0016689 A1* | 1/2012 | Strawmyer et al. | 705/2 |
| 2012/0041852 A1* | 2/2012 | Lane et al. | 705/30 |
| 2012/0330688 A1* | 12/2012 | Goldsmith et al. | 705/4 |
| 2013/0006884 A1* | 1/2013 | Carroll et al. | 705/322 |
| 2013/0024214 A1* | 1/2013 | Schoen et al. | 705/4 |
| 2013/0046563 A1* | 2/2013 | Landry | 705/4 |
| 2013/0073320 A1* | 3/2013 | DeLarme | 705/4 |
| 2013/0124233 A1* | 5/2013 | Walker et al. | 705/4 |
| 2013/0159204 A1* | 6/2013 | Vianello | 705/321 |
| 2013/0317866 A1* | 11/2013 | Templeman et al. | 705/4 |
| 2014/0019316 A1* | 1/2014 | Cross et al. | 705/30 |

OTHER PUBLICATIONS

Atound the Inland Valley; Staff reports; Inland Valley Daily Bulletin; Ontario, Ca, Nov. 29, 2008.*

EU Commissioner Almunia slams; UPI Arabia 2000(Washington) May 23, 2008.*

\* cited by examiner

SYSTEM, METHOD AND COMPUTER PROGRAM PRODUCT FOR IMPLEMENTATION AND MANAGEMENT OF CHANGE-OF-CONTROL SEVERANCE

FIELD OF THE INVENTION

The present invention relates generally to merger and acquisition assistance technology and, more particularly, to a system for the implementation and management of severance payments during a change-of-control process.

BACKGROUND

Change-of-control ("COC") severance policies have evolved over time, largely driven by the merger and acquisition environment and the federal tax rules imposing an excise tax on individuals. Typically COC severance policies are triggered when there is a COC of a company or some other pre-determined event. COC typically refers to the acquisition of ownership of a certain percentage of the company; a reverse merger involving the company; significant changes in the board of directors for the company; the sale or disposition of substantially all of the assets of the company; or the liquidation or dissolution of the company. Such policies are offered to a certain class of employees ("Participants") within a company, most commonly the senior executive team. Subject to various pre-determined conditions, generally, if a COC occurs and the executive is terminated from the company ("double trigger"), the participant is generally entitled to a cash severance payment and immediate vesting of unvested equity. The value of this benefit is often referred to as a parachute payment.

One drawback to such a system is that the benefit may be subject to certain taxes above and beyond standard federal/state taxes. In particular, there is the potential for an excise tax on those portions of the benefit in excess of the participant's base amount (average W-2 over the previous 5 years) if the entire benefit is greater than the participant's safe harbor amount (3 times the base amount). As a result, a small increase in benefit which exceeds the safe harbor amount, could result in an inequitable increase in taxes.

To address the additional tax an individual may owe resulting from such parachute payments, companies may agree to pay an additional "gross-up" amount in addition to the parachute payment. The gross-up amount essentially results in an increased payment to the executive to address taxes, deductions, and the like, that may be incurred and is meant to provide the executive with the intended benefit had the excise tax not been incurred.

However, critics of executive compensation have brought the use of gross-ups to the forefront of the political and public conscience, and companies are now being pressured to eliminate the use of them. The elimination of gross-ups has created the unintended outcome of winners and losers among members of executive teams, which in turn results in suboptimal consistency in the enthusiasm and focus among executives facing a corporate transaction. Shareholders want and need their executive team to be focused during a potential change of control, and the elimination of gross-ups has created an outcome that can often put members on different sides of the issues.

In view of the foregoing, there is a need for a dynamic system to automatically apply an equitable severance plan to all qualifying individuals within a company.

DESCRIPTION OF ILLUSTRATIVE EMBODIMENTS

Illustrative embodiments and related methodologies of the present invention are described below as they might be employed in a COC severance implementation and management system. In the interest of clarity, not all features of an actual implementation or methodology are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methodologies of the invention will become apparent from consideration of the following description and drawings.

Figure 1:
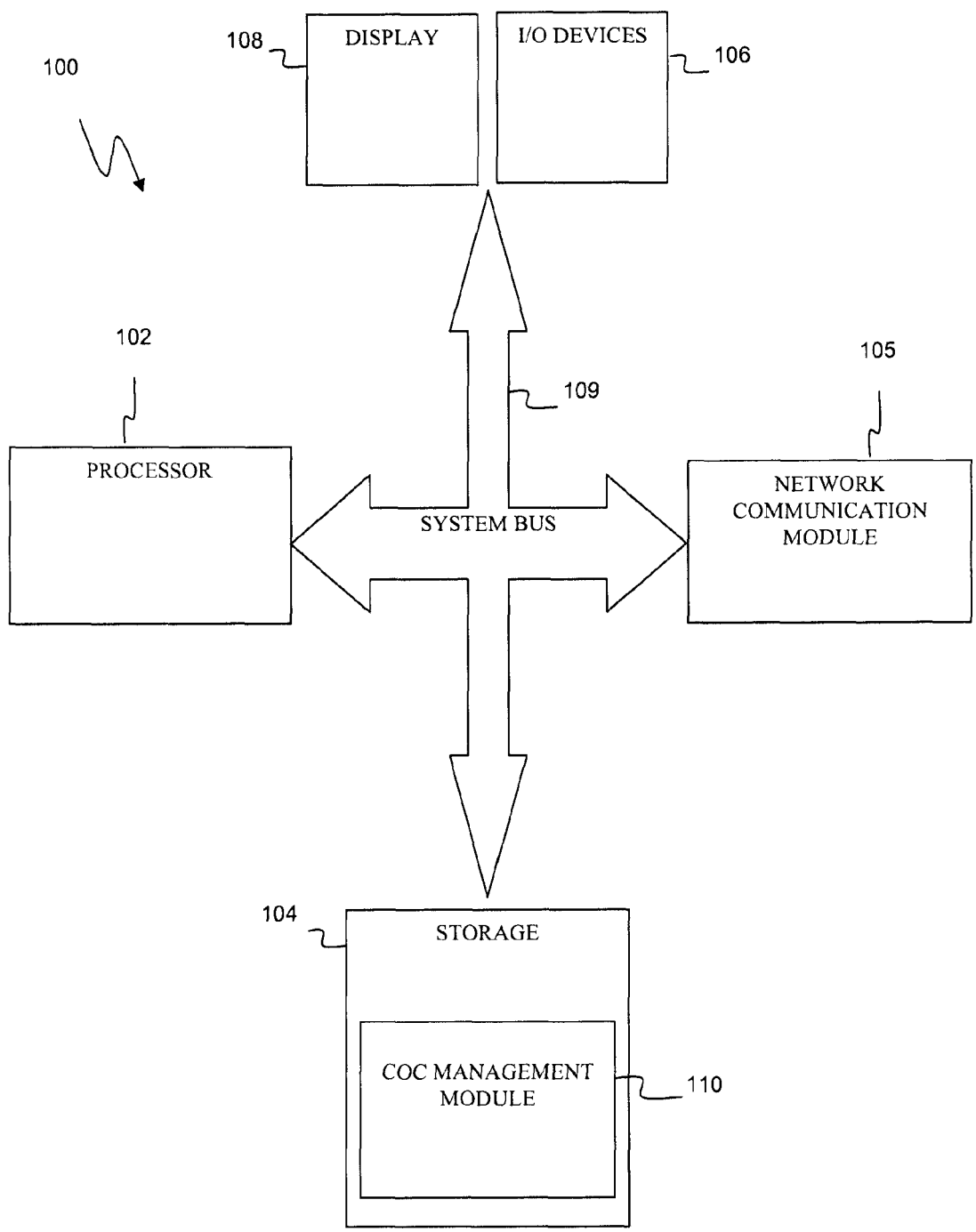
FIG. 1 is a block diagram of a change-of-control system according to an exemplary embodiment of the present invention.

FIG. 1 shows a block diagram of COC computer system 100 adapted for implementing the COC management system as described herein, according to an exemplary embodiment of the present invention. In one embodiment, the COC system 100 includes at least one processor 102, a non-transitory, computer-readable storage 104, network communication module 105, optional I/O devices 106, and an optional display 108, all interconnected via a system bus 109. Software instructions executable by the processor 102 for implementing software instructions stored within COC management module 110 in accordance with the exemplary embodiments described herein, may be stored in storage 104.

Although not explicitly shown in FIG. 1, it will be recognized that the COC system 100 may be connected to one or more public and/or private networks via appropriate network connections. It will also be recognized that the software instructions comprising the COC management module 110 may be loaded into storage 104 from a CD-ROM or other appropriate storage media via wired or wireless means. Persons of ordinary skill in the art having the benefit of this disclosure will appreciate that based on the number of Participants in the change-of-control pool, hundreds of thousands, or millions, of scenarios of cash distribution to Participants may be possible in the event of a change-in-control. Moreover, the data inputs and values described herein (e.g., market capitalization, Salary, Bonus, pool percentage, etc.) processor 102 utilizes for various calculations may be provided to COC system 100 manually, called from memory, or the data could be downloaded by COC system 100 from some local or remote source, as would be understood by persons ordinarily skilled in the art having the benefit of this disclosure.

Figure 2:
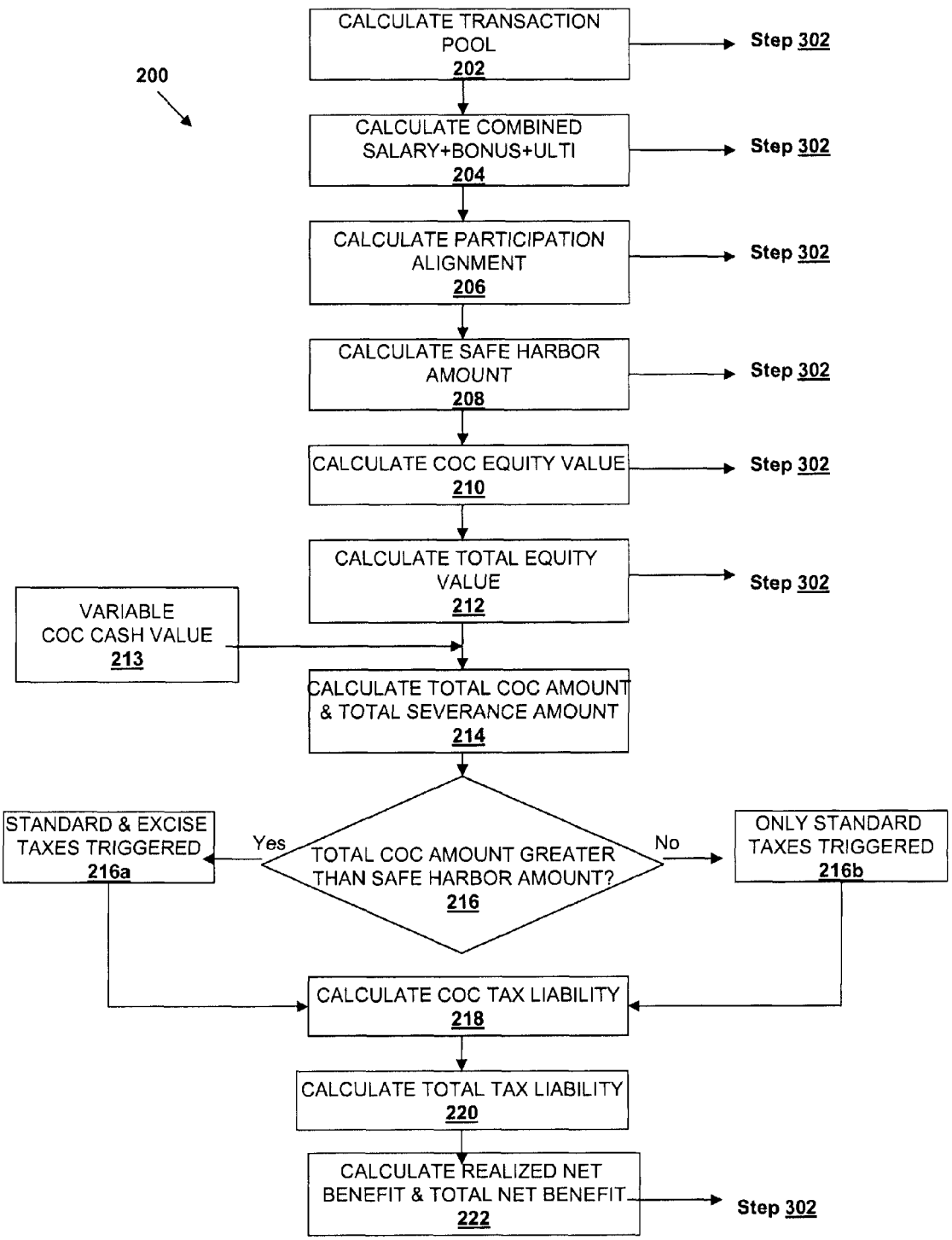
FIG. 2 is a logic flow chart for determining a Realized Net Benefit and Total Net Benefit according to an exemplary methodology of the present invention.

In an exemplary embodiment of the present invention, the functionality of COC management module 110 is implemented using the methodology illustrated in FIG. 2, and generally designated as 200, so as to determine a change-of-control maximized benefit, or severance amount, for each Participant. A COC benefit is a cash severance amount that will be paid to the Participant if the Participant's employment is terminated during a designated period following a change-of-control. The COC Cash Value for each Participant is their portion of the "Transaction Pool" (the total cash available to be distributed to all the Participants as cash severance). As described below, the COC Cash Values of the present invention are variable values which are varied until they are allocated such that a maximized net benefit is realized for the executive team, while at the same time satisfying other predetermined criteria as discussed below.

Referring to the exemplary methodology of FIG. 2, it will now be described how COC system 100 determines the Maximized Realized Net Benefit for a Participant. In step 202, processor 102 calculates the total cash available to be distributed to all the Participants as cash severance, or as previously stated, the Transaction Pool. The Transaction Pool is calculated by multiplying the company's market capitalization as of the day immediately prior to the date of the COC ("Company Value") by a predetermined percentage ("Sharing Pool Percentage"). The Sharing Pool Percentage is typically determined by reference to the market norms for the industry of the company, as would be understood by persons ordinarily skilled in the art having the benefit of this disclosure.

In step 204, processor 102 calculates a combined salary plus bonus plus Unvested Long Term Incentive ("ULTI") for each Participant ("Combined Salary+Bonus+ULTI"). ULTI includes grants of restricted stock or stock options, performance units, and any other long-term compensation for Participants, as well as the present value of the continuation of benefits. Through use of the ULTI, a Participant's tenure is allowed to be taken into account. Processor 102 determines the Combined Salary+Bonus+ULTI for each Participant by adding the Participant's current annual rate of base salary (excluding any bonus or incentive compensation) from the company ("Base Salary"), plus the targeted annual bonus(es) for the fiscal year in which the change-of-control occurs ("Target Bonus"), plus the Participant's ULTI. In this exemplary embodiment, processor 102 selects the Target Bonus based on the assumption that the target goals giving rise to the bonus had been achieved.

In step 206, processor 102 calculates the "Participation Alignment" for each Participant. The Participation Alignment is determined by dividing the Salary+Bonus+ULTI for a Participant by the Combined Salary+Bonus+ULTI for all Participants, thus resulting in a certain percentage amount for each Participant which, in total, adds up to 100%. Persons of ordinary skill in the art having the benefit of this disclosure will understand that such a ratio permits the level of each Participant to be scaled relative to the other Participants.

In step 208, processor 102 calculates the "Safe Harbor" amount for each Participant. In this exemplary embodiment, processor 102 sets the Safe Harbor amount at three times the Participant's Base Amount (average W-2 payment for a period of five years preceding the change-of-control), per guidelines set by the IRS. However, in instances when the Participant has been employed with the company for less than five years, the average Base Amount over that shorter time period is used to calculate the Safe Harbor amount.

In step 210, processor 102 calculates the "COC Equity Value," which is the value of the Participant's outstanding and unvested equity awards potentially subject to an excise tax. In an alternative embodiment, this value requires no calculation, as the COC Equity Value can be manually inputted via I/O device 106, or called from local or remote memory. Further, the COC Equity Value may include restricted or unrestricted stock, stock options, and the like. COC Equity Value may also include the present value of benefits continuation coverage that is provided to each Participant under a severance arrangement. In this exemplary embodiment, COC Equity Value does not represent the total value of the Participant's unvested equity, but rather the amount considered to be a "parachute payment", per guidelines set by the IRS.

In step 212, processor 102 then calculates the "Total Equity Value" for each Participant. Total Equity Value is the total value of the Participant's unvested equity at the date of the change-of-control calculation. As previously stated, the COC Equity Value is the present value of the Total Equity Value. Under present IRS guidelines, the COC Equity Value is subject to excise taxes and standard federal/state taxes, while the Total Equity Value greater than the COC Equity Value is subject to standard federal/state taxes only.

Figure 3:
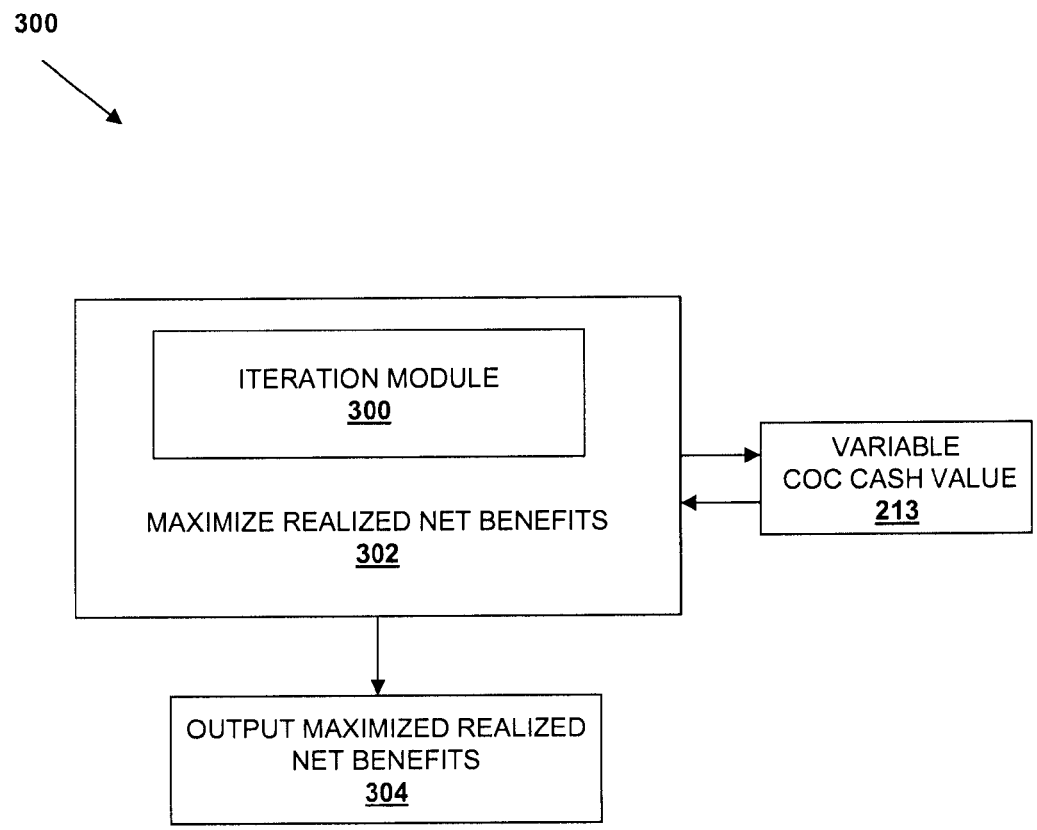
FIG. 3 is a logic flow chart for determining a Maximized Realized Net Benefit according to an exemplary methodology of the present invention.

Also, note that the foregoing values calculated in steps 202-212 are fed into step 302 of FIG. 3, as will be described below. Nevertheless, at step 213, processor 102 calculates the initial COC Cash Values for each Participant. This initial COC Cash Value is a "dummy" value that is calculated by multiplying the Transaction Pool by each Participant's Participation Alignment. After this dummy COC Cash Value is initially utilized to perform the remaining logic of FIG. 2, it is no longer utilized. Instead, it will be replaced by the Variable COC Cash Value determined in step 302, as will be described below.

In step 214, processor 102 then calculates the "Total COC Amount" and "Total Severance Amount" for each Participant. To calculate the Total COC Amount, processor 102 adds the COC Equity Value to the COC Cash Value amount for that Participant. To calculate the Total Severance Amount, processor 102 adds the Total Equity Value to the COC Cash Value amount for the Participant.

At step 216, processor 102 determines whether the Total COC Amount is greater than the Safe Harbor Amount for each Participant. If processor 102 determines the Total COC Amount is greater than the Partipant's Safe Harbor Amount, than an excise tax has been triggered. Once the excise tax has been triggered for a Participant at step 216*a*, processor 102 then takes the Total COC Amount and subtracts the Participant's Base Amount. Processor 102 then takes the resulting amount and multiplies it by the excise tax rate, presently 20%, per IRS guidelines. Then processor 102 takes the Total COC Amount and calculates the standard federal/state tax liability. Thereafter, at step 218, processor 102 adds the excise tax liability and standard tax liability to compute the COC Tax Liability.

At step 220, processor 102 calculates the Total Tax Liability by first determining the taxes due on the incremental income representing the difference in the Total Equity Value and the COC Equity Value, which is taxed at standard federal/state tax rates. Once this is calculated, processor 102 then adds this incremental tax amount to the COC Tax Liability, which results in the Total Tax Liability. Thereafter, at step 222, processor 102 takes the Total Severance Amount and Total COC Amount and subtracts the Total Tax Liability (from Total Severance Amount) and COC Tax Liability (from Total COC Amount), thus resulting in the Realized Net Benefit and Total Net Benefit, respectively, for each Participant.

However, going back to step 216, if processor 102 determines that the Total COC Amount is not greater than the Participant's Safe Harbor Amount, then that Participant is not subject to the excise tax. Rather, the Total COC Amount is only taxed at the standard federal/state taxation rates (step 216b), thus resulting in the corresponding COC Tax Liability for that Participant, which is computed by processor 102 at step 218 as previously discussed. Thereafter, at step 220, processor 102 calculates the Total Tax Liability for that Participant, also as previously discussed. At step 222, processor 102 again takes the Total Severance Amount and Total COC Amount and subtracts the Total Tax Liability and COC Tax Liability, respectively, thus resulting in the Realized Net Benefit and Total Net Benefit, respectively, for that Participant.

At this stage in the exemplary methodology, the initial set of values have been determined using the methodology of FIG. 2. Referring to FIG. 3, processor 102 will now perform an iteration algorithm 300 according to an exemplary embodiment of the present invention. The initial values calculated in steps 202-212 are final values and will not change. However, the initial COC Cash Values determined in step 213 will now be varied until the Realized Net Benefit of the execute team has been maximized.

Thus, at step 302, using the data inputs from steps 202-222, processor 102, via iteration module 300, performs upwards of millions of iterations in order to maximize the sum of the Realized Net Benefit for the executive team, while maintaining their respective Participation Alignments, and ensuring the different variations of the Participant's COC Cash Value amounts do not exceed the Transaction Pool. As illustrated by the bi-directional arrows to and from the Variable COC Cash Value of FIG. 3, it is shown how that each time the Variable COC Cash Value is changed, processor 102 utilizes the new value to perform steps 213-222 again. This iteration loop is continued until the Realized Net Benefits are maximized in step 302 or some defined maximum number of loops have been performed. Moreover, this same functionality is illustrated in FIG. 2 in that the Variable COC Cash Value of step 213 is utilized to perform the logic of steps 214-222. Therefore, each time the value is varied, the subsequent values calculated in steps 214-222 are also altered, until a Maximum Realized Net Benefit is realized.

In this exemplary embodiment, iteration module 300 is the Premium Solver Platform™ software, developed by Frontline Systems, Inc. of Incline Village, Nev. However, those ordinarily skilled in the art having the benefit of this disclosure realize other iteration platforms may be utilized. As would be understood by one ordinarily skilled in the art having the benefit of this disclosure, iteration module 300 considers all of the data inputs from steps 202-212, and also considers all of the parameters in place such as the total COC Cash for the executive team cannot exceed the Transaction Pool and the Realized Net Benefit must align with the Participation Alignment, etc. The module then runs millions of scenarios by changing the allocation of COC Cash to each participant until the Realized Net Benefit for the executive team is maximized. Ultimately, at step 302, COC management module 110 will output the severance amount for each Participant that maximizes the Realized Net Benefit for the executive team ("Maximized Realized Net Benefit"). At step 304, processor 102 outputs the Maximized Realized Net Benefits.

Figure 4:
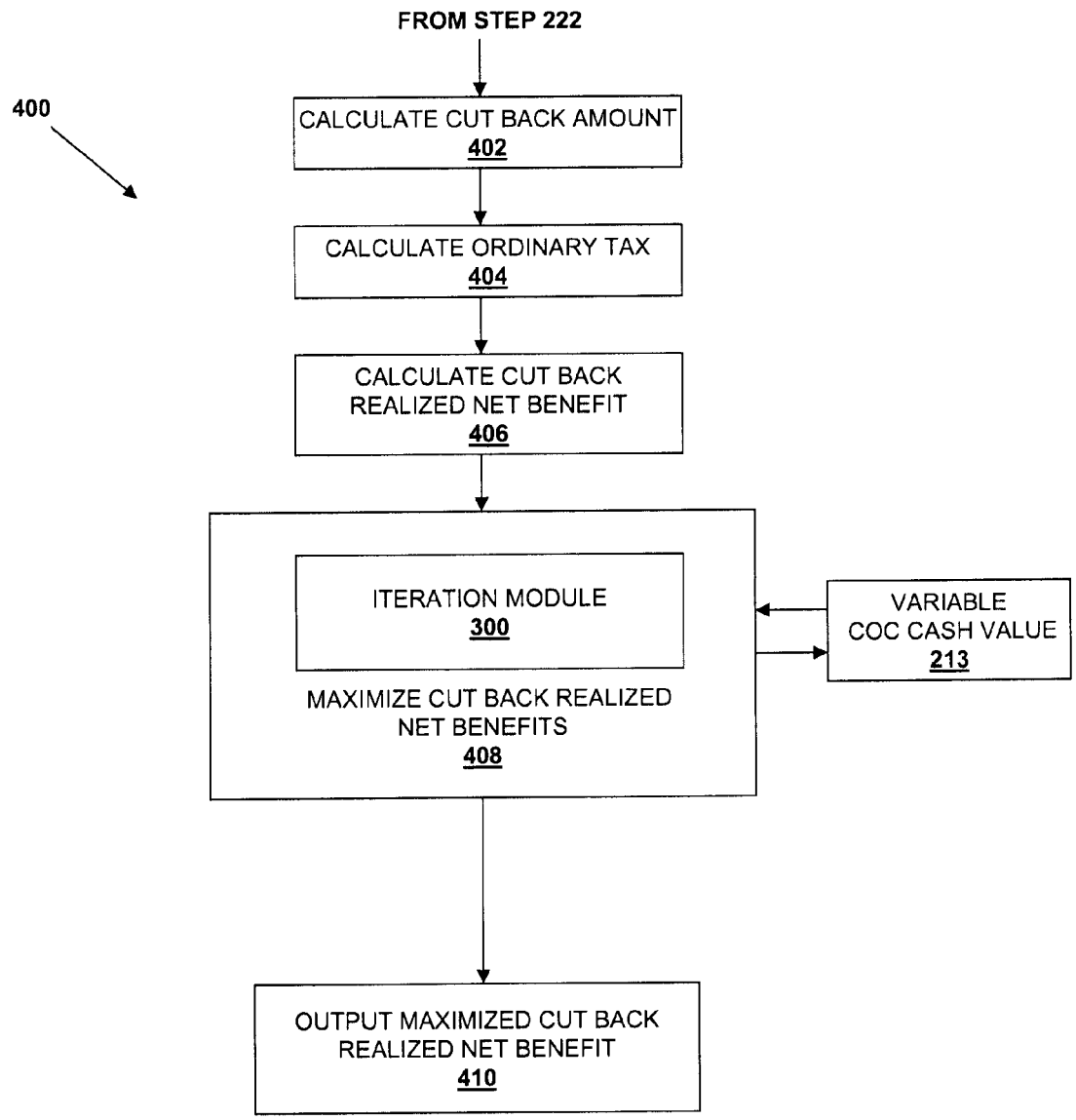
FIG. 4 is a logic flow chart for determining a Maximized Cut-Back Realized Net Benefit according to an exemplary methodology of the present invention.

FIG. 4 illustrates an alternative exemplary methodology of the present invention whereby COC management module 110 includes a cutback feature. Here, processor 102 performs the same steps as described above in relation to FIGS. 2 & 3, however, after step 220, the process continues as described below.

Referring to FIG. 4, cutback algorithm 400 will now be described. At step 402, processor 102 calculates a "Cut-Back Amount," which is defined as the amount the Total Severance must be reduced to avoid triggering an excise tax. To calculate the Cut-Back Amount, processor 102 first determines whether an excise tax was triggered. If no excise tax was triggered, the Cut-Back Amount is equal to the Total Severance Amount (step 214). However, if an excise tax was triggered, the Cut-Back Amount is determined using the following equation:

Cut-Back Amount=Total Severance Amount−(Total COC Amount−Safe Harbor Amount)

Next, at step 404, processor 102 calculates the Ordinary Tax on the Cut-Back Amount using the following equation:

Ordinary Tax on Cut-Back Amount=Cut-Back Amount×Ordinary Tax Rate

Next, at step 406, processor 102 calculates the Cut-Back Realized Net Benefit utilizing the following equation:

Cut-Back Realized Net Benefit=Cut-Back Amount−Ordinary Tax

Thereafter, at step 408, processor 102 determines the Maximized Cut-Back Realized Net Benefit for each Participant utilizing iteration module 300. Here, processor 102 utilizes the same inputs as previously described, except that the inputs also include the Cut-Back Realized Net Benefit (step 406). In order to calculate the Maximized Cut-Back Realized Net Benefit for each Participant, Processor 102 must ensure that the Realized Net Benefit (step 222) is greater than or equal to the Cut-Back Realized Net Benefit. If it is not, processor 102 continues to cycle through iterations of the COC Cash Values, while also considering the Transaction Pool and Participant Alignments, until the Maximized Cut-Back Realized Net Benefit is achieved for the executive team At step 410, processor 102 outputs the Maximum Cut-Back Realized Net Benefits.

Figure 5:
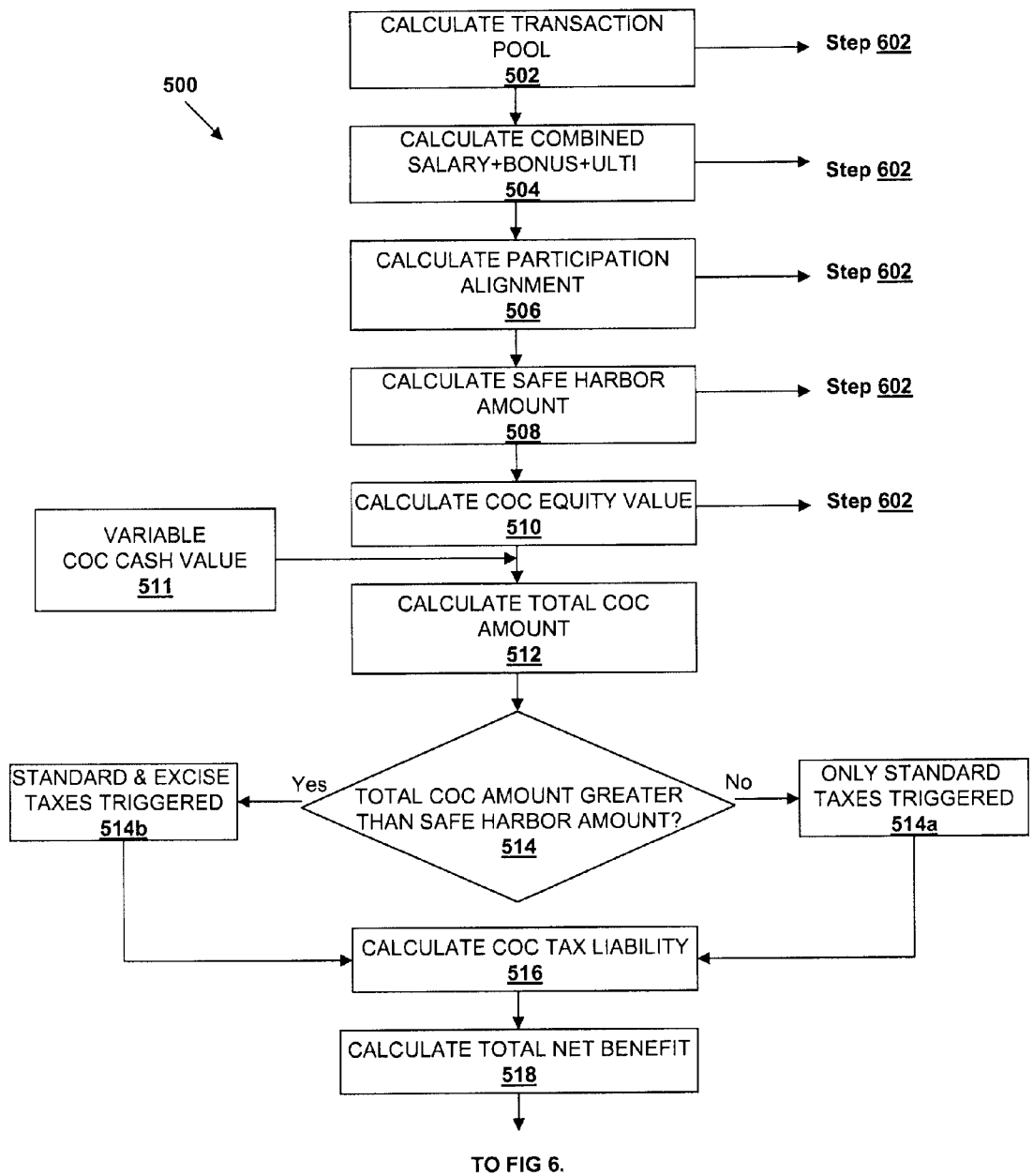
FIG. 5 is a log flow chart for determining a Total Net Benefit according to an exemplary methodology of the present invention.

Referring to FIG. 5, an alternative exemplary methodology of the present invention will now be described. Note that the terms used below have previously been defined in this disclosure and will not be reproduced here. However, unlike those methodologies previously described, this methodology will only utilize the parachute amounts. In other words, in the following process, the Total Net Benefit is maximized instead of the Realized Net Benefit as was accomplished in previously described methodologies. In step 502, processor 102 calculates the Transaction Pool by multiplying the company's market capitalization by the Sharing Pool. In step 504, processor 102 calculates the Combined Salary+Bonus+ULTI. In step 506, processor 102 calculates the Participation Alignment for each Participant. In step 508, processor 102 calculates the Safe Harbor amount for each Participant. In step 510, processor 102 calculates the COC Equity Value, and at step 511 the initial COC Cash Value is determined.

In step 512, processor 102 then calculates the Total COC Amount for each Participant. In step 514, processor 102 determines whether the Total COC Amount is greater than Safe Harbor Amount for each Participant. If processor 102 determines the Total COC Amount is greater than the Participant's Safe Harbor Amount, then an excise tax has been triggered. Once the excise tax has been triggered at step 514*a*, processor 102 then takes the Total COC Amount and subtracts the Base Amount for each Participant. Processor 102 then takes the resulting amount and multiplies it by the excise tax rate, presently 20%, per IRS guidelines. Then processor 102 takes the Total COC Amount and calculates the standard federal/state tax liability. Thereafter, at step 516, processor 102 adds the excise tax liability and standard tax liability to compute the COC Tax Liability. At step 518, processor 102 calculates the Total Net Benefit for each Participant.

However, going back to step 514, if processor 102 determines that the Total COC Amount is not greater than the Participant's Safe Harbor Amount, then that Participant is not subject to the excise tax. Rather, the Total COC Amount is only taxed at the standard federal/state taxation rates (step 514*bb*), thus resulting in the corresponding COC Tax Liability for that Participant, which is computed by processor 102 at step 516 as previously discussed. Thereafter, at step 518, processor 102 calculates the Total Net Benefit for that Participant.

Figure 6:
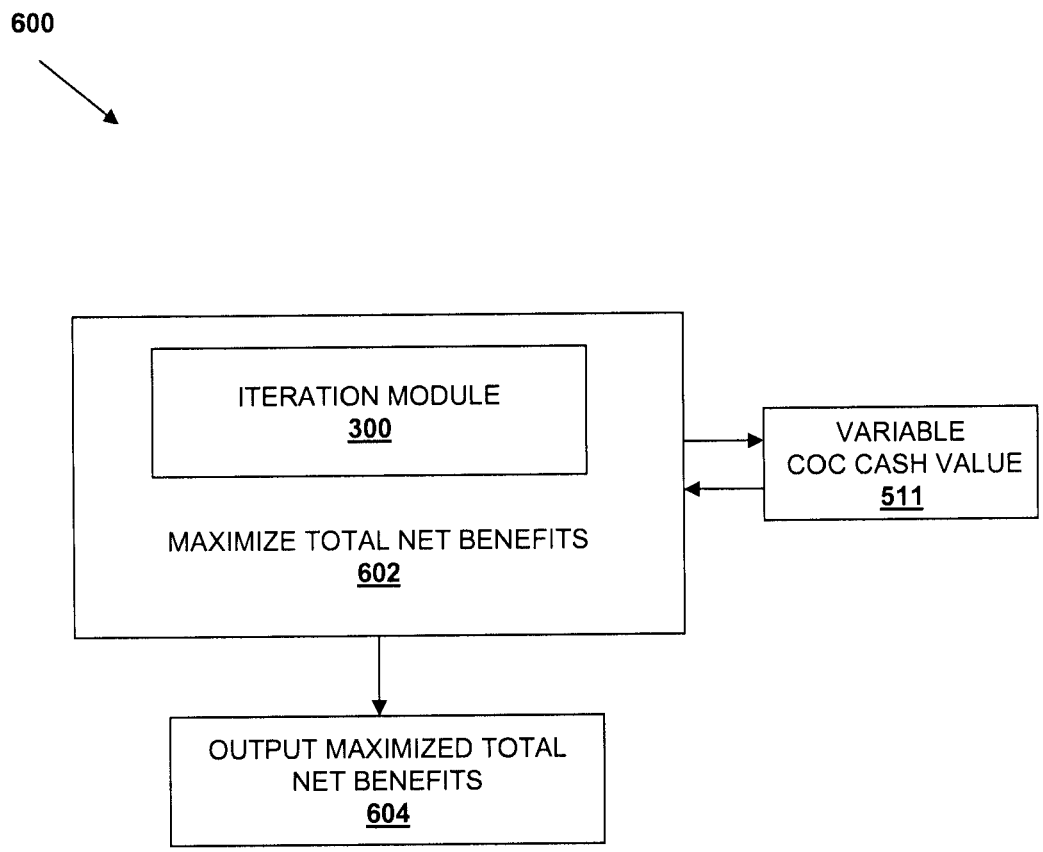
FIG. 6 is a logic flow chart for determining a Maximum Total Net Benefit according to an exemplary methodology of the present invention.

At this stage in the exemplary methodology, the initial set of values have been determined using the methodology of FIG. 5. Referring to FIG. 6, processor 102 will now perform an iteration algorithm 600 according to an exemplary embodiment of the present invention. The initial values calculated in steps 502-210 are final values and will not change. However, the initial COC Cash Values determined in step 511 will now be varied until the Total Net Benefits have been maximized.

Thus, at step 602, using the data inputs from steps 502-510, processor 102, via iteration module 600, performs upwards of millions of calculations in order to maximize the sum of the Realized Net Benefit for the executive team, while maintaining their respective Participation Alignments, and ensuring the different variations of the Participant's COC Cash Value amounts do not exceed the Transaction Pool. As illustrated by the bi-directional arrows to and from the Variable COC Cash Value of FIG. 5, it is shown how that each time the Variable COC Cash Value is changed, processor 102 utilizes the new value to perform steps 512-518 again. This iteration loop is continued until the Realized Net Benefits are maximized in step 602 or some defined maximum number of loops have been performed. Moreover, this same functionality is illustrated in FIG. 5 in that the Variable COC Cash Value of step 511 is utilized to perform the logic of steps 512-518. Therefore, each time the value is varied, the subsequent values calculated in steps 512-518 are also altered, until a Maximum Realized Net Benefit is realized.

Figure 7:
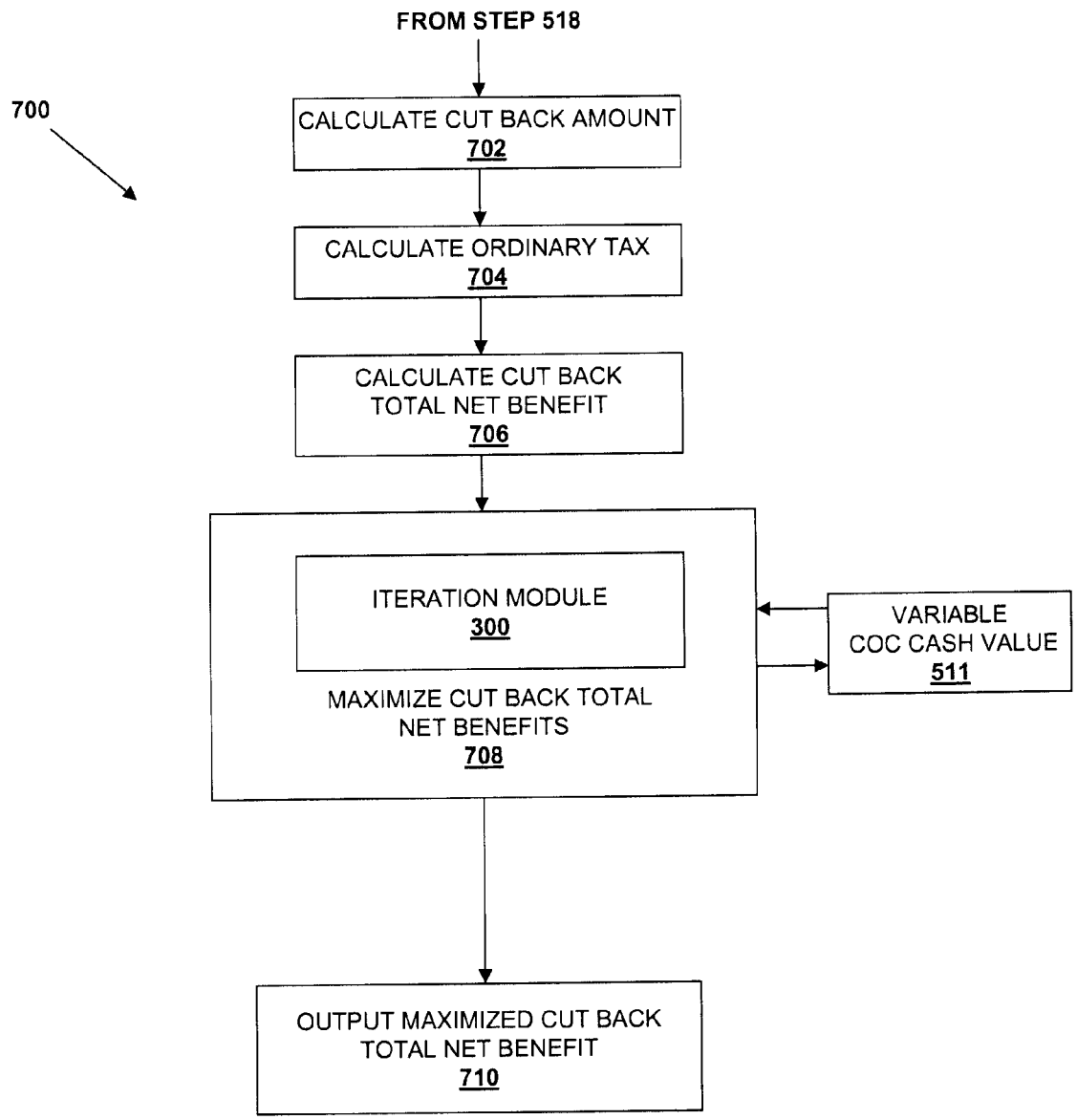
FIG. 7 is a logic flow chart for determining a Maximum Cut-Back Total Net Benefit according to an exemplary methodology of the present invention.

FIG. 7 illustrates an alternative exemplary methodology of the present invention whereby COC management module 110 includes a cutback feature. Here, processor 102 performs the same steps as described above in relation to FIG. 5, however, after step 516, the process continues as described below.

Referring to FIG. 7, cutback algorithm 700 will now be described. At step 702, processor 102 calculates the Cut-Back Amount. To calculate the Cut-Back Amount, processor 102 first determines whether an excise tax was triggered. If no excise tax was triggered, the Cut-Back Amount is equal to the Total COC Amount (step 512). However, if an excise tax was triggered, the Cut-Back Amount is determined using the following equation:

Cut-Back Amount=Total COC Amount−Safe Harbor Amount

Next, at step 704, processor 102 calculates the Ordinary Tax on the Cut-Back Amount using the following equation:

Ordinary Tax on Cut-Back Amount=Cut-Back Amount×Ordinary Tax Rate]

Next, at step 706, processor 102 calculates the Cut-Back Total Net Benefit utilizing the following equation:

Cut-Back Total Net Benefit=Cut-Back Amount−Ordinary Tax

Thereafter, at step 708, processor 102 determines the Maximized Cut-Back Total Net Benefit for each Participant utilizing iteration module 300. Here, processor 102 utilizes the same inputs as previously described, except that the inputs also include the Cut-Back Total Net Benefit (step 706). In order to calculate the Maximized Cut-Back Total Net Benefit for each Participant, processor 102 must ensure that the Total Net Benefit (step 222) is greater than or equal to the Cut-Back Total Net Benefit. If it is not, processor 102 continues to cycle through iterations of the COC Cash Values, while also considering the Transaction Pool and Participant Alignments, until the Maximized Cut-Back Total Net Benefit is achieved for the executive team. At step 710, processor 102 outputs the Maximum Cut-Back Total Net Benefits.

An exemplary embodiment of the present invention provides a computer-implemented method to determine severance payments for one or more individuals during a change-of-control ("COC"), the method comprising the steps of (a) calculating a transaction pool, the transaction pool being a total amount of cash available to be distributed to the one or more individuals as the severance payments; (b) calculating a COC cash value for the one or more individuals, the COC cash value being an individuals portion of the transaction pool; (c) varying the COC cash value for the one or more individuals until a maximized net benefit is determined for the one or more individuals; and (d) outputting a severance payment for the one or more individuals that represents the maximized net benefit for the one or more individuals.

In another embodiment, step (c) further comprises the step of analyzing tax implications for the one or more individuals in determining the maximized net benefit for the one or more individuals. In yet another, step (b) further comprises the steps of calculating a cut-back amount for the one or more individuals, the cut-back amount being an amount the severance payment for the one or more individuals must be reduced in order to avoid triggering an excise tax; and utilizing the cut-back amount to calculate the COC cash value for the one or more individuals. In another, the method further comprises the step of analyzing excise taxes for the one or more individuals in order to calculate the cut-back amount for the one or more individuals. In yet another, step (c) further comprises the step of ensuring the varying COC cash values for the one or more individuals does not exceed the transaction pool. Yet another further comprises the step of scaling the severance payments in relation to one another. In another, the method further comprises the step of analyzing tenure of the one or more individuals to determine the severance payments for the one or more individuals.

Although various embodiments and methodologies have been shown and described, the invention is not limited to such embodiments and methodologies and will be understood to include all modifications and variations as would be apparent to one skilled in the art. Therefore, it should be understood that the invention is not intended to be limited to the particular forms disclosed. Rather, the intention is to cover all modifications, equivalents and alternatives falling within the spirit and scope of the invention as defined by the appended claims.

What we claim is:

1. A computer-implemented method to determine severance amounts for a team of two or more individuals during a change-of-control ("COC"), the method comprising:
   (a) calculating a transaction pool, the transaction pool being a total amount of cash available to be distributed to the team as the severance amounts;
   (b) calculating a participation alignment for each individual based upon compensation of each individual;
   (c) calculating initial COC cash values for each individual, the initial COC cash values being the individual's portion of the transaction pool scaled relative to one another based upon the participation alignment;
   (d) calculating a total equity value for each individual that represents a total unvested equity award as of a date of the COC;
   (e) calculating a total severance amount for each individual by adding the initial COC cash value to the total equity value;
   (f) calculating a total tax liability of each individual;
   (g) subtracting the total tax liability from the total severance amount to thereby determine a realized net benefit for each individual, thereby obtaining the realized net benefit for the team;
   (h) varying the initial COC cash values for each individual to thereby produce a variable COC cash value for each individual, and continuing to vary the variable COC cash values until final COC cash values are determined for each individual, the final COC cash values representing a maximized realized net benefit for the team; and
   (i) outputting severance amounts for the individuals that jointly represent the maximized realized net benefit for the team,
   wherein (a)-(i) are performed by a computer processing unit communicably coupled to memory comprising instructions which, when executed by the computer processing unit, results in performance of (a)-(i).

2. A computer-implemented method as defined in claim 1, wherein:
   calculating the initial COC cash values comprises multiplying the transaction pool by the participation alignment; and
   varying the initial COC cash values comprises:
      calculating a COC equity value for each individual that represents an unvested equity award potentially subject to an excise tax;
      calculating a total COC amount for each individual by adding the initial COC cash value to the COC equity value;
      calculating tax liabilities of the total COC amounts and total severance amounts for each individual;
      varying the initial COC cash values to produce the variable COC cash values, and continuing to vary the variable COC cash values; and
      calculating the tax liabilities again based upon the variable COC cash values until the final COC cash values are determined by maximizing the realized net benefit for the team.

3. A computer-implemented method as defined in claim 1, wherein (h) further comprises:
   calculating a cut-back amount for the individuals, the cut-back amount being an amount the severance amounts for the individuals must be reduced in order to avoid triggering an excise tax; and
   utilizing the cut-back amount to vary the variable COC cash values for the individuals until the final COC cash values are determined.

4. A computer-implemented method as defined in claim 1, further comprising scaling the maximized realized net benefit in relation to one another based upon the participation alignment.

5. A computer-implemented method as defined in claim 1, wherein (b) further comprises analyzing tenure of the individuals to calculate the participation alignment.

6. A computer-program product comprising instructions which, when executed by at least one processor, causes the processor to perform the methods comprising:
   (a) calculating a transaction pool, the transaction pool being a total amount of cash available to be distributed to the team as the severance amounts;
   (b) calculating a participation alignment for each individual based upon compensation of each individual;
   (c) calculating initial COC cash values for each individual, the initial COC cash values being the individual's portion of the transaction pool scaled relative to one another based upon the participation alignment;
   (d) calculating a total equity value for each individual that represents a total unvested equity award as of a date of the COC;
   (e) calculating a total severance amount for each individual by adding the initial COC cash value to the total equity value;
   (f) calculating a total tax liability of each individual;
   (g) subtracting the total tax liability from the total severance amount to thereby determine a realized net benefit for each individual, thereby obtaining the realized net benefit for the team;
   (h) varying the initial COC cash values for each individual to thereby produce a variable COC cash value for each individual, and continuing to vary the variable COC cash values until final COC cash values are determined for each individual, the final COC cash values representing a maximized realized not benefit for the team; and
   (i) outputting severance amounts for the individuals that jointly represent the maximized realized net benefit for the team.

7. A computer-program product as defined in claim 6, wherein:
   calculating the initial COC cash values comprises multiplying the transaction pool by the participation alignment; and
   varying the initial COC cash values comprises:
      calculating a COC equity value for each individual that represents an unvested equity award potentially subject to an excise tax;
      calculating a total COC amount for each individual by adding the initial COC cash value to the COC equity value;
      calculating tax liabilities of the total COC amounts and total severance amounts for each individual;
      varying the initial COC cash values to produce the variable COC cash values, and continuing to vary the variable COC cash values; and
      calculating the tax liabilities again based upon the variable COC cash values until the final COC cash values are determined by maximizing the realized net benefit for the team.

8. A computer-program product as defined in claim 6, wherein (h) further comprises:
   calculating a cut-back amount for the individuals, the cut-back amount being an amount the severance amounts for the individuals must be reduced in order to avoid triggering an excise tax; and utilizing the cut-back amount to vary the variable COC cash values for the individuals until the final COC cash values are determined.

9. A computer-program product as defined in claim 6, further comprising scaling the maximized realized net benefit in relation to one another based upon the participation alignment.

10. A computer-program product as defined in claim 6, wherein (b) further comprises analyzing tenure of the individuals to calculate the participation alignment.

* * * * *